(12) United States Patent
Nama et al.

(10) Patent No.: US 12,347,422 B2
(45) Date of Patent: Jul. 1, 2025

(54) SYSTEMS AND METHODS FOR INDICATING COMMUNICATION EFFICIENCY OR COMPLIANCE WITH ATC PHRASEOLOGY

(71) Applicant: HONEYWELL INTERNATIONAL INC., Charlotte, NC (US)

(72) Inventors: Naveen Venkatesh Prasad Nama, Bangalore (IN); Chaya Garg, Plymouth, MN (US); Vasantha Paulraj, Madurai (IN); Gobinathan Baladhandapani, Madurai (IN); Hariharan Saptharishi, Madurai (IN); Sivakumar Kanagarajan, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 492 days.

(21) Appl. No.: 17/573,995

(22) Filed: Jan. 12, 2022

(65) Prior Publication Data

US 2023/0115227 A1 Apr. 13, 2023

(30) Foreign Application Priority Data

Oct. 12, 2021 (IN) .............................. 202111046425

(51) Int. Cl.
  *G10L 15/18* (2013.01)
  *G06F 40/30* (2020.01)
  (Continued)

(52) U.S. Cl.
  CPC .......... *G10L 15/1815* (2013.01); *G10L 15/22* (2013.01); *G10L 15/30* (2013.01); *G10L 2015/088* (2013.01); *G10L 2015/225* (2013.01)

(58) Field of Classification Search
  CPC ..... G10L 15/1815; G10L 15/18; G10L 15/22; G10L 15/30; G10L 15/08; G10L 15/26;
  (Continued)

(56) References Cited

U.S. PATENT DOCUMENTS 6,175,314 B1  1/2001  Cobley
7,809,405 B1  10/2010  Rand et al.
(Continued)

FOREIGN PATENT DOCUMENTS

CN  108562892 A  9/2018
EP     2874133 A1  5/2015
(Continued)

*Primary Examiner* — Leshui Zhang
(74) *Attorney, Agent, or Firm* — Lorenz & Kopf LLP

(57) ABSTRACT

Systems and methods for indicating communication effectiveness with air traffic control (ATC) are disclosed. The method includes: receiving a transcribed message containing a plurality of words used by an ownship flight crew member in a communication directed to ATC; determining a message intent of the transcribed message from the words used in the communication; identifying a plurality of ideal words that should be used for an ideal message having the same message intent as the transcribed message; comparing the words used in the communication with the words that should have been used in the ideal message; determining based on the comparing whether the words used in the communication conformed to ATC standard phraseology (e.g., ICAO Pilot communication vocabulary); generating an indicator for flight crew that indicates whether the words used in the communication conformed to ATC standard phraseology; and signaling an aircraft display device to display the indicator.

20 Claims, 8 Drawing Sheets

(51) Int. Cl.
*G06F 40/56* (2020.01)
*G08G 5/26* (2025.01)
*G08G 5/55* (2025.01)
*G10L 15/08* (2006.01)
*G10L 15/22* (2006.01)
*G10L 15/26* (2006.01)
*G10L 15/30* (2013.01)
*G10L 25/48* (2013.01)

(58) Field of Classification Search
CPC ......... G10L 2015/088; G10L 2015/225; G10L 25/48; G06F 40/284; G06F 40/56; G06F 40/253; G06F 40/30; G08G 5/0013; G08G 5/00; G08G 5/0021; G08G 5/0052; G08G 5/0008; G08G 5/0039; G08G 5/045; G08G 5/0078; G08G 5/003; G08G 5/0034; G08G 5/0004; G08G 5/0026; G08G 5/0017; G08G 5/0069; G01C 23/00; G01C 23/005; B64D 43/00; B64D 45/00; H04B 7/18506
USPC .... 704/270, 270.1, 272, 274, 275, 276, 278; 340/906, 907–931, 4.14, 3.42, 3.43, 3.44, 340/5.1, 10.5; 381/86
See application file for complete search history.

(56) References Cited

U.S. PATENT DOCUMENTS

| | | | |
|---|---|---|---|
| 8,103,007 | B2 | 1/2012 | Shields et al. |
| 9,446,852 | B2 | 9/2016 | Lacko et al. |
| 9,466,290 | B2 | 10/2016 | Joyce |
| 9,620,020 | B2 | 4/2017 | Wang et al. |
| 10,157,616 | B2 | 12/2018 | Agarwal et al. |
| 10,157,617 | B2 | 12/2018 | Shamasundar |
| 10,902,732 | B2 | 1/2021 | Srinivasan et al. |
| 2015/0081138 | A1 | 3/2015 | Lacko et al. |
| 2015/0112687 | A1 | 4/2015 | Bredikhin |
| 2015/0162001 | A1* | 6/2015 | Kar ................ G08G 5/0013 704/235 |
| 2016/0379640 | A1* | 12/2016 | Joshi ................ G10L 15/26 704/235 |
| 2019/0147858 | A1 | 5/2019 | Letsu-Dake et al. |
| 2020/0372916 | A1 | 11/2020 | Delpech |

FOREIGN PATENT DOCUMENTS

| | | |
|---|---|---|
| EP | 2874133 B1 | 5/2015 |
| EP | 3109857 A1 | 12/2016 |
| EP | 3889947 A1 | 10/2021 |
| JP | 2014228691 A * | 12/2014 |

* cited by examiner

SYSTEMS AND METHODS FOR INDICATING COMMUNICATION EFFICIENCY OR COMPLIANCE WITH ATC PHRASEOLOGY

CROSS REFERENCE TO RELATED APPLICATION

The present application claims benefit of prior filed India Provisional Patent Application No. 202111046425, filed Oct. 12, 2021, which is hereby incorporated by reference herein in its entirety.

TECHNICAL FIELD

Embodiments of the subject matter described herein relate generally to flight crew communications with air traffic control. More particularly, embodiments of the subject matter relate to communication effectiveness between to a flight crew an air traffic control.

BACKGROUND

There are multiple reasons for inefficient utilization of a radio channel for aircraft to ATC communication. In systems used for transcribing voice communication between a flight crew member and an air traffic controller, the voice communication messages received from the external world as well as from the flight crew on the aircraft are susceptible to misinterpretation due to a noisy environment as well as a noisy medium of communication. Another major reason for inefficient utilization of a radio channel particularly around a busy airport is due to inefficient communication between ATC and pilots. This can occur when either party to a communication uses nonstandard ATC communication phraseology and/or speaks at a rate that is too fast to be easily comprehended. Also, due to the potential stigma that may arise when multiple requests are made to ATC to repeat a clearance instruction, a flight crew member may not always ask for clarification, make a best guess regarding a clearance instruction, at times guess wrong. The inefficiencies can result into pilots making by performing the wrong operations, which can endanger flight safety.

Hence, it is desirable to provide systems and methods for improving communication efficiencies. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an aircraft system in an aircraft for indicating communication effectiveness in communications with air traffic control (ATC) is disclosed. The aircraft system includes an aircraft display device and a controller. The controller is configured to: receive a transcribed message containing a plurality of words used by an ownship flight crew member in a communication directed to ATC; determine a message intent of the transcribed message from the words used in the communication; identify a plurality of ideal words that should be used for an ideal message having the same message intent as the transcribed message; compare the words used in the communication with the words that should have been used in the ideal message; determine, based on comparing the words used in the communication with the words that should have been used, whether the words used in the communication conformed to ATC standard phraseology; generate an indicator for flight crew that indicates whether the words used in the communication conformed to ATC standard phraseology (e.g., ICAO Pilot communication vocabulary); and signal to the aircraft display device to display the indicator.

In one embodiment, the controller may be further configured to: determine for each of a plurality of messages from flight crew to ATC a rate at which the ownship flight crew member verbally expressed message content; generate a speech rate display element (e.g., too fast) that indicates that an ownship message to ATC was spoken at a rate higher than a predetermined threshold level; associate the speech rate display element to a message when the rate at which the ownship flight crew member verbally expressed the message was higher than the predetermined threshold level; and signal the aircraft display device to display the speech rate display element to alert the flight crew that the message was spoken at a rate higher than the predetermined threshold level.

In one embodiment, the controller may be further configured to: (a) analyze transcribed messages between the ownship and ATC; (b) compute, based on the analysis, a plurality of analytic results that include a plurality of: (i) ownship call sign recognition accuracy; (ii) ownship transcription accuracy; (iii) ownship classification accuracy; (iv) a number of instances of ownship callout omissions over a specific period (e.g., a flight); (v) a number of instances of the use of non-standard phraseology over a specific period (e.g., a flight); (vi) a frequency congestion index; (vii) a number of instances of the use of non-standard phraseology in relation to the frequency congestion index; (viii) a total number of communications and communication delays over a specific period (e.g., a flight); and (ix) a number of instances of incorrect and/or inadequate and/or omission of a readback over a specific period (e.g., a flight); and (c) signal an aircraft display device to display the computed analytic results to allow an ownship flight crew member to judge how well it is adhering to ATC standard phraseology through the display of the computed analytic results.

In another embodiment, an aircraft system in an aircraft for indicating communication effectiveness in communications with air traffic control (ATC) is disclosed. The aircraft system includes an output device and a controller. The controller is configured to: record a plurality of ownship messages between ATC and an ownship flight crew member and a plurality of ownship messages between flight crew members on the ownship; transcribe the recorded ownship messages into text; determine for each transcribed ownship message whether to associate to the transcribed ownship message with one or more parameters from a set of parameters that describe different types of erroneous messages; compute an effectiveness score based on summing each occurrence of a parameter multiplied by a weight assigned to the parameter; and signal an output device to display the computed effectiveness score.

In one embodiment, the controller may be further configured to: generate a user interface (UI) that includes one or more parameter selection buttons for selecting a parameter from the set of parameters to review, a first message window panel for displaying a transcribed message associated with the parameter, a second message window panel for displaying a transcribed responsive message, and second buttons for controlling the UI to facilitate scrolling through message exchanges that are associated with the selected parameter; and signal the aircraft display device to display the UI.

In another embodiment, a method in an aircraft for indicating communication effectiveness in communications with air traffic control (ATC) is disclosed. The method includes: receiving a transcribed message containing a plurality of words used by an ownship flight crew member in a communication directed to ATC; determining a message intent of the transcribed message from the words used in the communication; identifying a plurality of ideal words that should be used for an ideal message having a same message intent as the transcribed message; comparing the words used in the communication with the words that should have been used in the ideal message; determining based on the comparing whether the words used in the communication conformed to ATC standard phraseology; generating an indicator for flight crew that indicates whether the words used in the communication conformed to ATC standard phraseology (e.g., ICAO Pilot communication vocabulary); and signaling to an aircraft display device to display the indicator.

In one embodiment, the method may further include: determining, for each of a plurality of messages from flight crew to ATC, a rate at which the ownship flight crew member verbally expressed message content; generating a speech rate display element (e.g., too fast) that indicates that an ownship message to ATC was spoken at a rate higher than a predetermined threshold level; associating the speech rate display element to a message when the rate at which the ownship flight crew member verbally expressed the message was higher than the predetermined threshold level; and signaling the aircraft display device to display the speech rate display element to alert the flight crew that the message was spoken at a rate higher than the predetermined threshold level.

In one embodiment, the method may further include (a) analyzing transcribed messages between the ownship and ATC, (b) computing, based on the analysis, a plurality of analytic results that include a plurality of: (i) ownship call sign recognition accuracy; (ii) ownship transcription accuracy; (iii) ownship classification accuracy; (iv) a number of instances of ownship callout omissions over a specific period (e.g., a flight); (v) a number of instances of the use of non-standard phraseology over a specific period (e.g., a flight); (vi) a frequency congestion index; (vii) a number of instances of the use of non-standard phraseology in relation to the frequency congestion index; (viii) a total number of communications and communication delays over a specific period (e.g., a flight); and (ix) a number of instances of incorrect and/or inadequate and/or omission of a readback over a specific period (e.g., a flight); and (c) signaling an aircraft display device to display the computed analytic results to allow an ownship flight crew member to judge how well it is adhering to ATC standard phraseology through the display of the computed analytic results.

In another embodiment, a method in an aircraft for indicating communication effectiveness in communications with air traffic control (ATC) is disclosed. The method includes: recording a plurality of ownship messages between ATC and an ownship flight crew member and a plurality of ownship messages between flight crew members on the ownship; transcribing the recorded ownship messages into text; determining for each transcribed ownship message whether to associate the transcribed ownship message with one or more parameters from a set of parameters that describe different types of erroneous messages; computing an effectiveness score based on summing each occurrence of a parameter multiplied by a weight assigned to the parameter; and signaling an output device to display the computed effectiveness score.

In one embodiment, the method may further include generating a user interface (UI) that includes one or more parameter selection buttons for selecting a parameter from the set of parameters to review, a first message window panel for displaying a transcribed message associated with the parameter, a second message window panel for displaying a transcribed responsive message, and second buttons for controlling the UI to facilitate scrolling through message exchanges that are associated with the selected parameter; and signaling the aircraft display device to display the UI.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
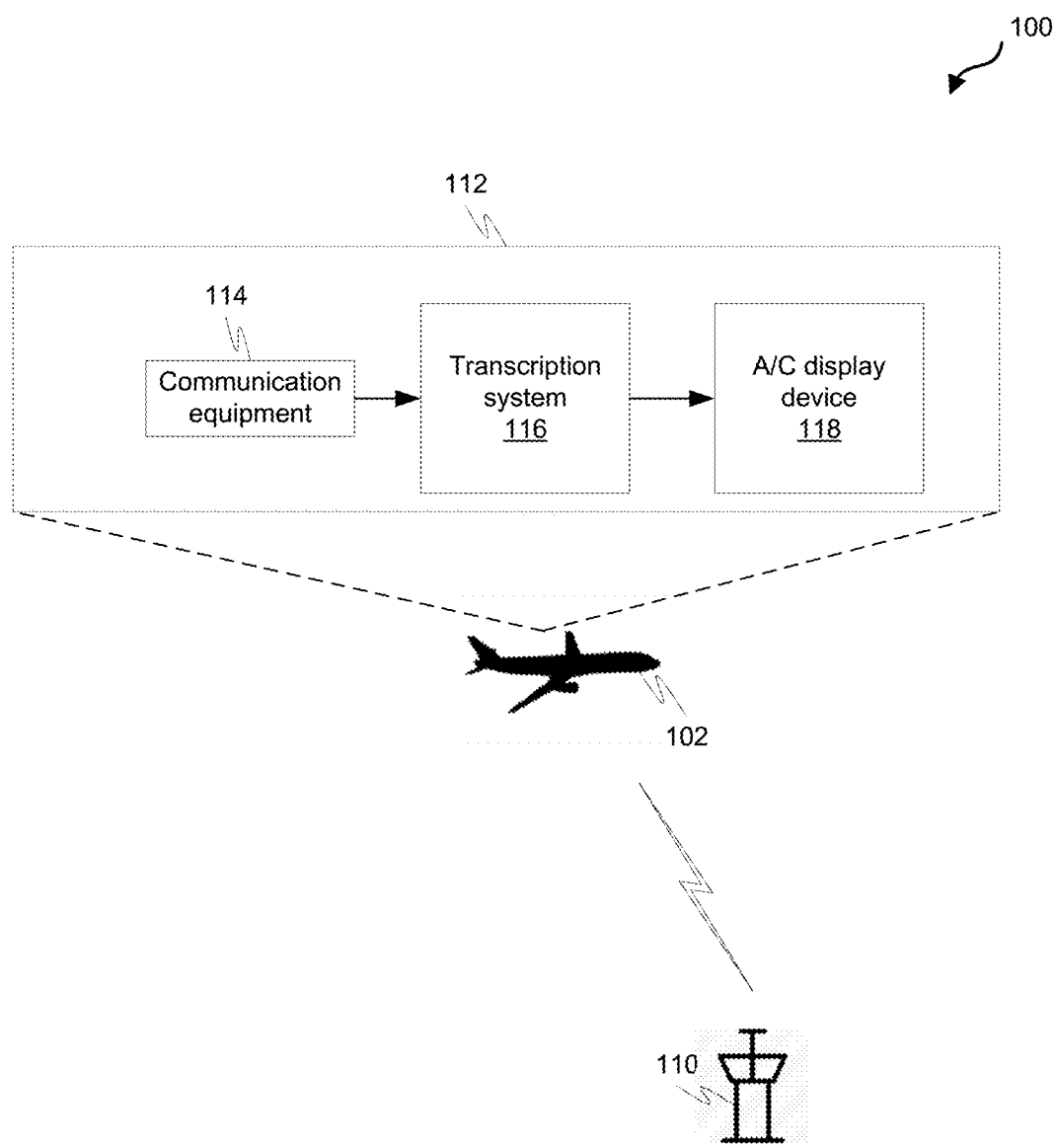
FIG. 1 is a is a block diagram depicting an example flight environment such as one around a busy aerodrome, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical components and various processing steps. It should be appreciated that such functional and/or logical components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques, and articles for indicating communication effectiveness in communications between flight crew in an aircraft and ATC. The disclosed apparatus, systems, techniques, and articles can provide cues to a speaker (e.g., ATC or Pilot) when the speaker is speaking at a rate that is too fast so that the speaker can slow down to provide a message recipient with a better opportunity to understand a message. The disclosed apparatus, systems, techniques, and articles can highlight the usage of nonstandard phraseology in utterances in real time or on demand The disclosed apparatus, systems, techniques, and articles can show the correct phraseology in the context of a specific utterance which had been flagged for usage of nonstandard phraseology. The disclosed apparatus, systems, techniques, and articles can identify usage of nonstandard phraseology for critical information such as ownship call sign, heading, altitude, etc. and provide metrics on demand for a given session. The disclosed apparatus, systems, techniques, and articles can provide a Frequency congestion Index by measuring the ratio of the duration of utterances vs. radio silence over specific time periods. This can be useful to identify busy times vs. relative free times at particular airports. The disclosed apparatus, systems, techniques, and articles can provide insights such as ownship call sign recognition accuracy, ownship transcription accuracy, ownship classification accuracy, number of instances of ownship callout omission, identify and highlight critical information, number of instances of the use of non-standard phraseology, frequency congestion index, number of instances of the use of non-standard phraseology in relation to frequency congestion index, total number of communications and communication delays, and the number of instances of incorrect/inadequate and/or omission of readback.

FIG. 1 is a block diagram depicting an example flight environment 100 such as one around a busy aerodrome. The example environment 100 includes one or more aerial vehicles 102, such as an airplane but could include a variety of types of aerial vehicles such as helicopters, UAVs (unmanned aerial vehicles), and others. The example environment 100 also includes a flight operation center (FOC) (e.g., air traffic control tower 110) containing control personnel such as air traffic controllers (ATC) for directing ground and air traffic in the vicinity of the aerodrome.

The example aerial vehicle 102 includes avionics equipment 112 that receives the ongoing communications between the aerial vehicle 102 and ATC 110 using communication equipment 114, and presents the ongoing communications as a continuous stream of audio to a transcription system 116. The transcription system 116 decodes the continuous stream of audio, generates formatted text from the decoded continuous stream of audio, and signals an aircraft (A/C) display device 118 to display the generated formatted text for viewing by the flight crew onboard the aerial vehicle 102. The aircraft display device 118 may be one of many types of graphical display units onboard an aircraft such as a navigation display, a PFD (primary flight display), a PED (personal electronic device), an EFB (electronic flight bag), HUD (heads up display), HDD (heads down display), and others.

Figure 2:
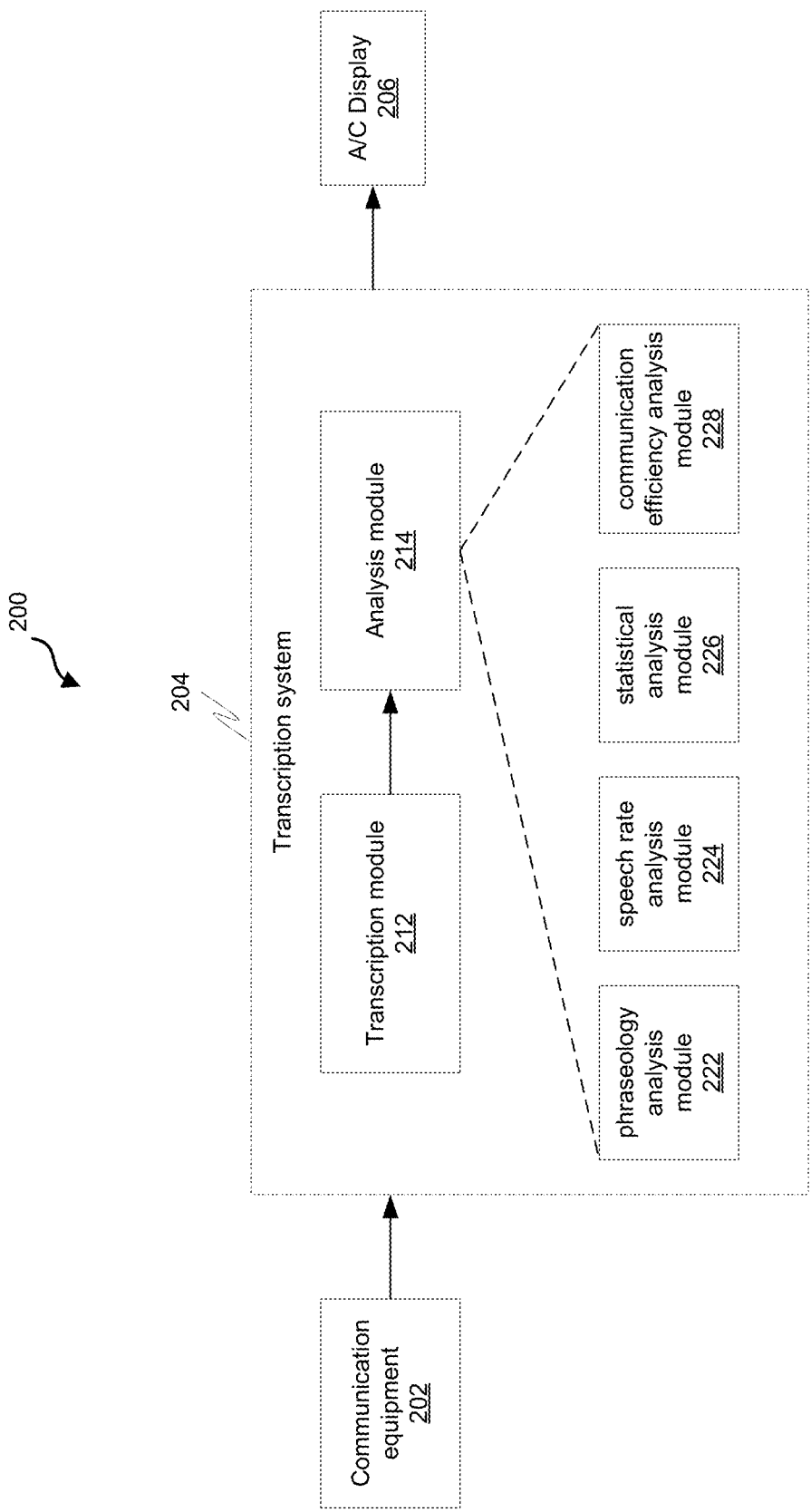
FIG. 2 is a is a block diagram depicting example avionics equipment, in accordance with some embodiments.

FIG. 2 is a block diagram depicting example avionics equipment 200. The example avionics equipment 200 includes communication equipment 202 and an example transcription system 204 for receiving outgoing communications from flight crew and generating information regarding the sufficiency of the outgoing communications for display onboard an aerial vehicle. The example communication equipment 202 may include a Com radio (such as that known in the art) and an intercom channel (such as that known in the art) for receiving and transmitting over-the-air communications between various aerial vehicles (ownship and traffic aerial vehicles) and ATC. The example communication equipment 202 may also include an audio panel (such as that known in the art) for accumulating the over-the-air communications from various sources and outputting the audio from the over-the-air communications. The example communication equipment 202 may further include a microphone or other voice gathering device for capturing flight crew utterances that are transmitted as over-the-air audio communications from the flight crew to ATC or other aerial vehicles.

The example transcription system 204 is configured to receive audio communications from the flight crew via the communication equipment 202, analyze the audio communications, and display information regarding the sufficiency of the outgoing communications onboard the aerial vehicle. The example transcription system 204 includes a transcription module 212 for extracting message content from the audio communications, and an analysis module 214 for analyzing the audio communications, generating information regarding the sufficiency of the audio communications, generating graphics for displaying the information regarding the sufficiency of the audio communications, and signaling an aircraft display device 206 to display the generated graphics onboard the aerial vehicle.

Each of the transcription module 212 and the analysis module 214 is implemented by a processing component such as a controller (e.g., the same or separate controllers). The processing component includes at least one processor and a computer-readable storage device or media encoded with programming instructions for configuring the processing component. The processor may be any custom-made or commercially available processor, a central processing unit (CPU), a graphics processing unit (GPU), an application specific integrated circuit (ASIC), a field programmable gate array (FPGA), an auxiliary processor among several processors associated with the processing component, a semiconductor-based microprocessor (in the form of a microchip or chip set), any combination thereof, or generally any device for executing instructions.

The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the processing component.

The example transcription module 212 is configured to retrieve message content from a plurality of flight crew originated voice messages and a plurality of messages from ATC to the ownship by transcribing the message content from the plurality of voice messages to text. The example transcription module 212 is configured to decode audio from ownship voice messages to ATC and audio from ATC voice messages to the ownship using speech recognition techniques to convert the audio into text. The speech recognition techniques may be implemented using machine learning techniques such as deep neural networks, statistical techniques, rule-based systems, and others. The example transcription module 212 may use various techniques such as NLP to convert the text from the audio to formatted text.

The example analysis module 214 may include one or more of a phraseology analysis module 222, a speech rate analysis module 224, a statistical analysis module 226, and a communication efficiency analysis module 228. The example phraseology analysis module 222 is configured to provide feedback regarding the sufficiency of the phraseology used in ownship messages to ATC. In one example, the phraseology analysis module 222 is configured to identify the words contained in a transcribed ownship message to ATC received from the transcription module 212, determine a message intent of the transcribed message from the identified words, identify a plurality of ideal words that should be used for an ideal message having the same message intent as the transcribed message, compare the words contained in the transcribed message with the words that should have been used in the ideal message, determine based on comparing the words contained in the transcribed message with the words that should have been used whether the transcribed message conformed to proper phraseology, and signal to the aircraft display device 206 to display an indication for flight crew that indicates whether the transcribed message conforms to proper phraseology.

When the transcribed message does not conform to proper phraseology, the example phraseology analysis module 222 is further configured to generate a corrected message string containing the words that were used in the transcribed message that match words from the ideal message plus the words from the ideal message that should have been used to convey the message using correct phraseology and signal the aircraft display device 206 to display the corrected message string, wherein the ownship flight crew is provided the capability of judging how well it is adhering to ATC standard phraseology through the display of the corrected message string. The words from the ideal message that should have been used but were not used can be made to be visually distinguishable (e.g., different color, highlighted, bolded, etc.) from the words that were used in the transcribed message that match words from the ideal message. The example phraseology analysis module 222 can be configured to display an indication for flight crew that indicates that the transcribed message did not conform to proper phraseology by making incorrect or nonstandard phraseology visually distinguishable (e.g., via different color, highlighted, bolded, etc.). The display of words from the ideal message that should have been used but were not used and/or the display of visually distinguishable incorrect or nonstandard phraseology may be performed immediately after a sentence is transcribed and/or on demand after the transcription. The example phraseology analysis module 222 can focus its identification of words from the ideal message that should have been used but were not used and/or its identification of incorrect or nonstandard phraseology to critical information such as ownship call sign, heading, altitude, and others.

In an example requested clearance for taxi from ATC, the pilot is expected use specific phraseology: <Facility being called> <aircraft identification> <aircraft surface position> <Request>. An example expected phraseology recited by a pilot may be: "Deer Valley Ground, Cessna Two Three Nine Lima, South Ramp, Request For Taxi."

Instead of using expected phraseology in this example, the pilot states: "Hello Deer Valley Tower, Cessna November Two Three Nine Lima, Request For Taxi." The example phraseology analysis module 222 is configured to cause the recited words that are not in accordance with proper radio phraseology to be displayed in a visually distinguishable way: e.g., "Hello Deer Valley Tower, Cessna November Two Three Nine, Request For Taxi." By making the incorrect phraseology visually distinguishable, the example phraseology analysis module 222 informs the pilot that "Hello" and the letter "N" should not have been included in the clearance request and other information that should have been included (which the bolded comma indicates) was omitted.

On demand, the example phraseology analysis module 222 is also configured to cause the phraseology that was expected to be used to be displayed with the portions that were missing or corrected in a visually distinguishable way: e.g., "Deer Valley Tower, Cessna Two Three Nine Lima, <your position>, Request For Taxi." By making the missing phraseology visually distinguishable, the example phraseology analysis module 222 informs the pilot that the suffix L was not called out and the aircraft's current position was missing in the request.

In an example requested altitude change for cruising, the pilot incorrectly states: "Deer Valley, Cessna Two Three Nine Lima, Request to climb to altitude Nineteen Thousand feet." The example phraseology analysis module 222 is configured to cause the recited words that are not in accordance with proper radio phraseology to be displayed in a visually distinguishable way. By making the incorrect phraseology visually distinguishable, the example phraseology analysis module 222 informs the pilot that "Nineteen Thousand feet" should not have been included in the clearance request.

On demand, the example phraseology analysis module 222 is also configured to cause the phraseology that should have been used to be displayed with the portions that were missing or corrected in a visually distinguishable way: e.g., "Deer Valley, Cessna Two Three Nine Lima, Request to climb to altitude Flight Level One Niner Zero." By making "Flight Level One Niner Zero" visually distinguishable, the example phraseology analysis module 222 informs the pilot that any altitude greater than 18000 ft MSL needs to be identified using "Flight Level" followed by individual digits of the requested flight level.

The example speech rate analysis module 224 is configured to analyze flight crew member voice utterances received form the communication equipment 202, determine a speech rate for a voice message from the flight crew member, and provide a cue (e.g., a speech rate display element) that informs when an ownship message to ATC is spoken at a rate that is too fast. The example speech rate analysis module 224 is configured to: (i) determine, for each message directed to ATC, a rate at which the ownship flight crew member verbally expressed message content; (ii) generate a speech rate display element (e.g., too fast graphical element) that indicates when an ownship message to ATC was spoken at a rate higher than a predetermined threshold level; and (iii) signal the aircraft display device 206 to display the speech rate display element when it is determined that the speech rate for a message exceeded the predetermined threshold level. The speech rate display element can provide a cue to the ownship flight crew member that informs that an ownship message to ATC is spoken at a rate that is too fast. When a message is spoken at a rate that is too fast, it can cause the message to be misinterpreted by the listener (e.g., ATC or flight crew member from other aircraft in the area).

The example statistical analysis module 226 is configured to analyze transcribed messages between the ownship and ATC and compute various analytic results. The computed analytic results may include one or more of the following: (i) ownship call sign recognition accuracy; (ii) ownship transcription accuracy; (iii) ownship classification accuracy; (iv) a number of instances of ownship callout omissions over a specific period (e.g., a flight); (v) critical information; (vi) a number of instances of the use of non-standard phraseology over a specific period (e.g., a flight); (vii) the frequency congestion index; (viii) a number of instances of the use of non-standard phraseology in relation to a frequency congestion index; (ix) a total number of communications and communication delays over a specific period; and/or (x) a number of instances of incorrect and/or inadequate and/or omission of a readback over a specific period (e.g., a flight).

The Ownship call sign recognition accuracy is a measure of the percentage of times during a flight that the transcription system (in the ownship) accurately recognized the ownship call sign in a message from ATC. The Ownship transcription accuracy is a measure of the percentage of times during a flight that the transcription system (in the ownship) accurately transcribed each spoken word in a message from ATC. The Ownship classification accuracy is a measure of the percentage of messages received during a flight that the transcription system (in the ownship) accurately classified as being directed to the ownship. The Ownship callout omission is an instance during a flight wherein an ownship flight crew member omitted to provide an expected call out of information, wherein a callout refers to verbally reciting information (e.g., data or command) The critical information refers to a subset of information in a clearance message from ATC that is deemed to be very important to be recognized accurately by the transcription system (in the ownship) so that the flight crew can fully comply with an ATC command contained in the clearance message. This information cannot be easily interpolated or cognitively corrected by an ownship flight crew in case of incorrect recognition, which may lead to noncompliance with an ATC command resulting in reduced built in safety margins, incidents, or accidents if the incorrectly recognized information is followed verbatim. The frequency congestion index may be determined by measuring the ratio of the duration of utterances (e.g., by the ownship, traffic aircraft, and ATC) versus radio silence over specific time periods, which can be useful for identifying busy times versus relative free times at particular airports. The communications and communication delays refers to the subject matter of the transmission and the latency associated with the same. An Incorrect/Inadequate and/or Omission of Readback refers to an instance during a flight that the ownship flight crew made an incorrect or inadequate readback of an ATC instruction or omitted to provide a readback of an ATC instruction, wherein a readback refers to reciting back to ATC the instruction that the flight crew member heard.

The example statistical analysis module 226 is further configured to signal an aircraft display device to display the computed analytic results, which provides an ownship flight crew member with the capability to judge how well it is adhering to ATC standard phraseology through the display of the computed analytic results. The example statistical analysis module 226 may be configured to compute the analytic results on an ongoing basis immediately after a sentence is transcribed and/or on demand during or after a flight.

The example communication efficiency analysis module 228 is configured to provide an indication regarding ownship communication efficiency with ATC. The example communication efficiency analysis module 228 is configured to: (a) receive a transcription of all ownship messages including messages between ATC and an ownship flight crew member and all messages between flight crew members on the ownship, for example, from the transcription module 212; (b) determine for each transcribed ownship message whether to associate the transcribed ownship message with one or more parameters from a set of parameters that describe different types of erroneous messages; (c) compute an effectiveness score for ownship communication based on summing each occurrence of a parameter multiplied by a weight assigned to the parameter; and (d) signal an output device (e.g., aircraft display device 206 or some other device on or off of the aircraft) to display the computed effectiveness score. The effectiveness score for ownship communication may be computed on an ongoing basis immediately after a sentence is transcribed and/or on demand during or after a mission.

The set of parameters may include: (i) a no readback error parameter; (ii) an erroneous readback error parameter; (iii) a non-standard parameter; (iv) a say again parameter; (v) an incomplete call sign parameter; (vi) a did not clarify parameter; (vii) a premature frequency switch parameter; (viii) a responding to wrong clearance parameter; (ix) an incorrect execution parameter; (x) a delayed response parameter; an others.

The example communication efficiency analysis module 228 may associate a clearance message with the no readback error parameter based on determining, for the clearance message from ATC, that an ownship flight crew member did not respond to the clearance message from ATC. The example communication efficiency analysis module 228 may associate a message with the erroneous readback error parameter based on determining, for the clearance message from ATC, that the response from an ownship flight crew member to the clearance message from ATC was not provided within a predetermine time frame or did not correspond to an expected response. The example communication efficiency analysis module 228 may associate a message with the non-standard parameter based on determining that an ownship flight crew member has used a word that is not defined in the ICAO Pilot communication vocabulary. The example communication efficiency analysis module 228 may associate a message with the say again parameter based on determining that an ownship flight crew member has asked for the same clearance more than a predetermined number of times. The example communication efficiency analysis module 228 may associate a message with the incomplete call sign parameter based on determining that an ownship flight crew member did not use a complete call sign when first talking to a new controller. The example communication efficiency analysis module 228 may associate a message with the did not clarify parameter based on determining that an ownship flight crew member did not ask for clarity on an ambiguous instruction provided by the controller. The example communication efficiency analysis module 228 may associate a message with the premature frequency switch parameter based on determining that an ownship flight crew member has tuned to a different frequency before the controller asked the pilot to do so. The example communication efficiency analysis module 228 may associate a message with the responding to wrong clearance parameter based on determining that an ownship flight crew member has responded to a clearance message issued to the pilot of another aircraft. The example communication efficiency analysis module 228 may associate a message with the incorrect execution parameter based on determining that an ownship flight crew member has caused the ownship to take off, land or cross a runway without an explicit clearance from ATC. The example communication efficiency analysis module 228 may associate a message with the delayed response parameter based on determining, for the clearance message from ATC, that an ownship flight crew member respond to the clearance message from ATC after a predetermine time frame.

The effectiveness score can be represented as,

Total Score=$(x1*w1)+(x2*w2)+ \ldots +(xn*wn)$

Wherein xi represents a parameter, and wi represents the weight that is assigned to the parameter. The weight is based on the criticality of the deviation.

This can be expressed as,

Total Score=$f(E)=\Sigma_{i=1}^{n}(Xi*Wi)$ wherein Xi represents a parameter, and Wi represents the weight that is assigned to the parameter.

The example communication efficiency analysis module 228 may be further configured to generate graphical elements for a user interface (UI) (e.g., UI 300) for displaying messages associated with the communication efficiency parameters.

Figure 3:
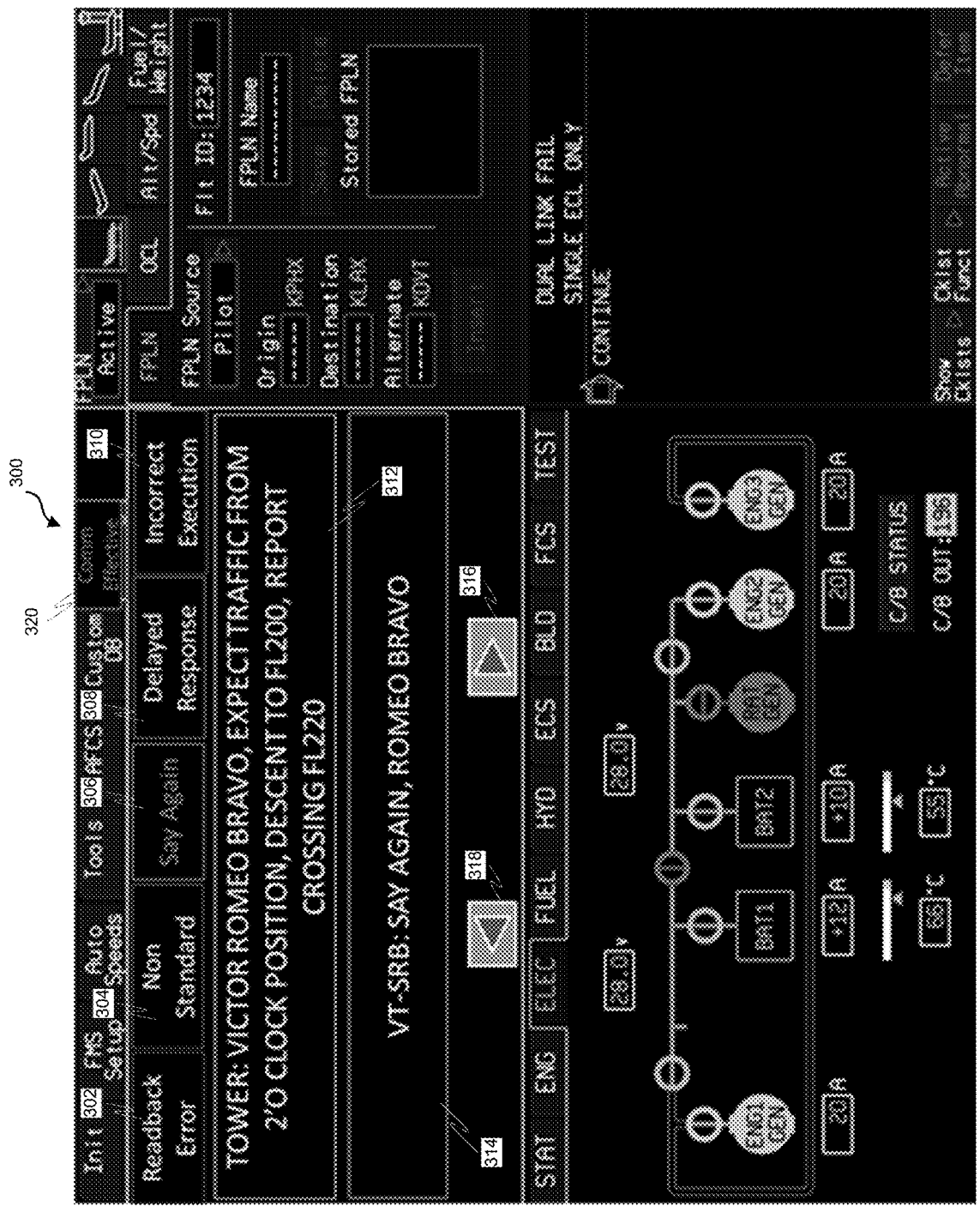
FIG. 3 is a diagram depicting an example UI, in accordance with some embodiments.

FIG. 3 is a diagram depicting an example UI 300. The example UI 300 includes a plurality of parameter selection buttons 302/304/306/308/310, an ATC message window panel 312, a flight crew member message window panel 314, a forward scroll arrow button 316, and a back scroll arrow button 318. The plurality of parameter selection buttons 302/304/306/308/310 includes a readback error parameter button 302, a non-standard parameter button 304, a say again parameter button 306, a delayed response parameter button 308, and an incorrect execution parameter button 310. Also, provided is a communication effectiveness button 320 that when selected causes the plurality of parameter selection buttons 302/304/306/308/310, the ATC message window panel 312, the flight crew member message window panel 314, the forward scroll arrow button 316, and the back scroll arrow button 318 to be provided on the UI 300.

In this example, the say again parameter button 306 has been selected. Responsive to selection of the say again parameter button 306, an ATC clearance message is presented in the ATC message window panel 312 and the response message from the flight crew that has been tagged with the say again parameter is presented in the flight crew member message window panel 314. The forward scroll arrow button 316 can be selected to scroll to the next instance of a message being tagged with the say again parameter. The back scroll arrow button 318 can be selected to scroll to a prior instance of a message being tagged with the say again parameter.

Figure 4:
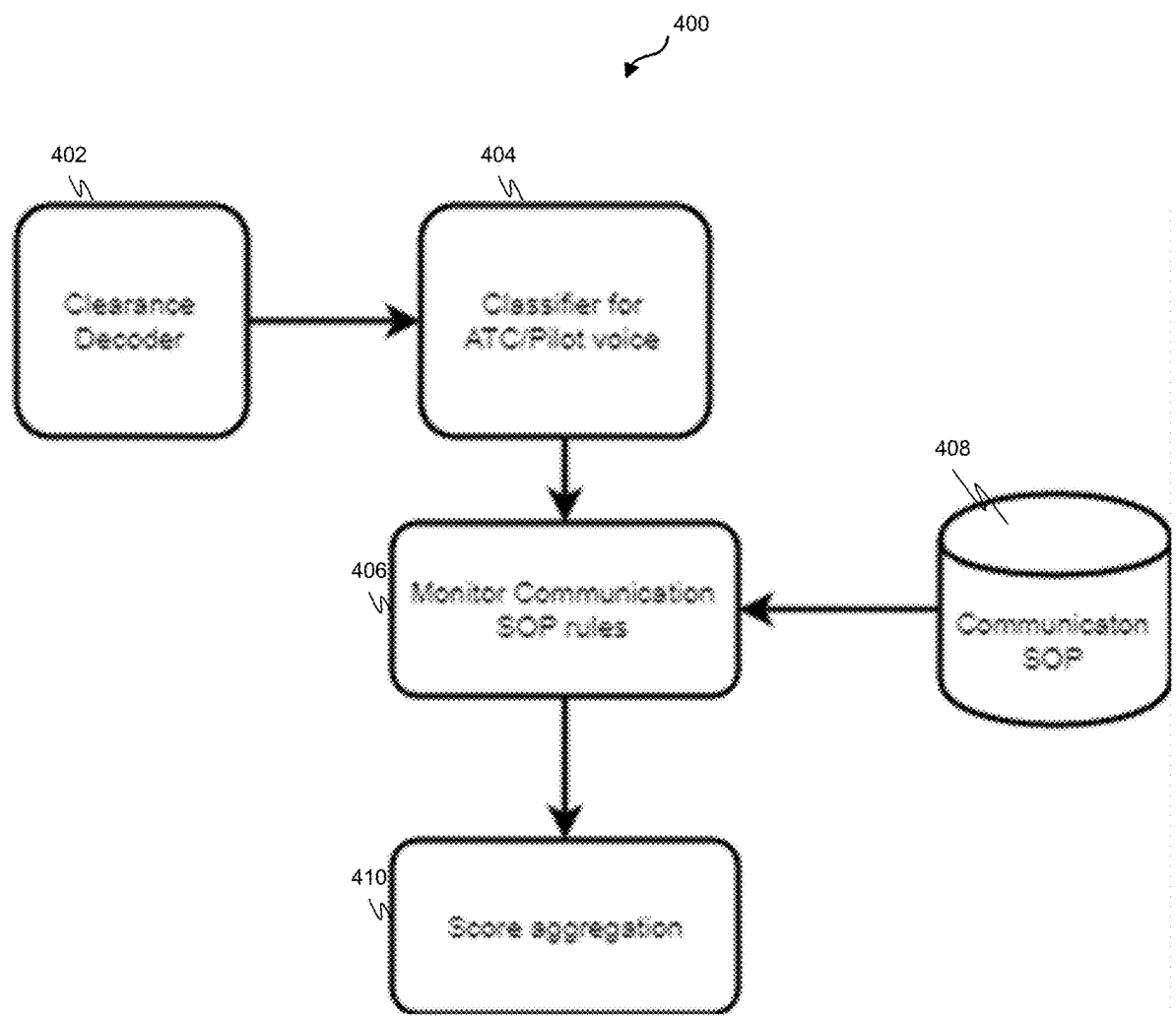
FIG. 4 is a block diagram depicting an example communication efficiency analysis system, in accordance with some embodiments.

FIG. 4 is a block diagram depicting an example communication efficiency analysis system 400. The example system 400 includes a clearance decoder 402 (e.g., transcription module 212) that decodes messages sent between a flight crew member and ATC. The example system 400 further includes a classifier 404 for classifying the decoded messages as originating from ATC or the flight crew member. The example system 400 also includes a monitor 406 for retrieving communication SOP rules from a communication SOP database 408 and determining whether the decoded messages complied with the communication SOP rules.

Determining whether the decoded messages complied with the communication SOP rules may involve determining for each decoded ownship message whether to associate the decoded ownship message with one or more parameters from a set of parameters that describe different types of erroneous messages. Determining whether the decoded messages complied with the communication SOP rules may also involve determining for each decoded ATC message whether a proper ownship response was made to the decoded ATC message and associating one or more parameters from the set of parameters that describe different types of erroneous messages to the decoded ATC messaged when a proper response was not received.

The monitor 406 is further configured to compute an effectiveness score for ownship communication based on summing each occurrence of a parameter multiplied by a weight assigned to the parameter (aka score aggregation 410). The classifier 404 and the monitor 406 may be implemented by the communication efficiency analysis module 228 and/or by the same or separate controllers.

Figure 5:
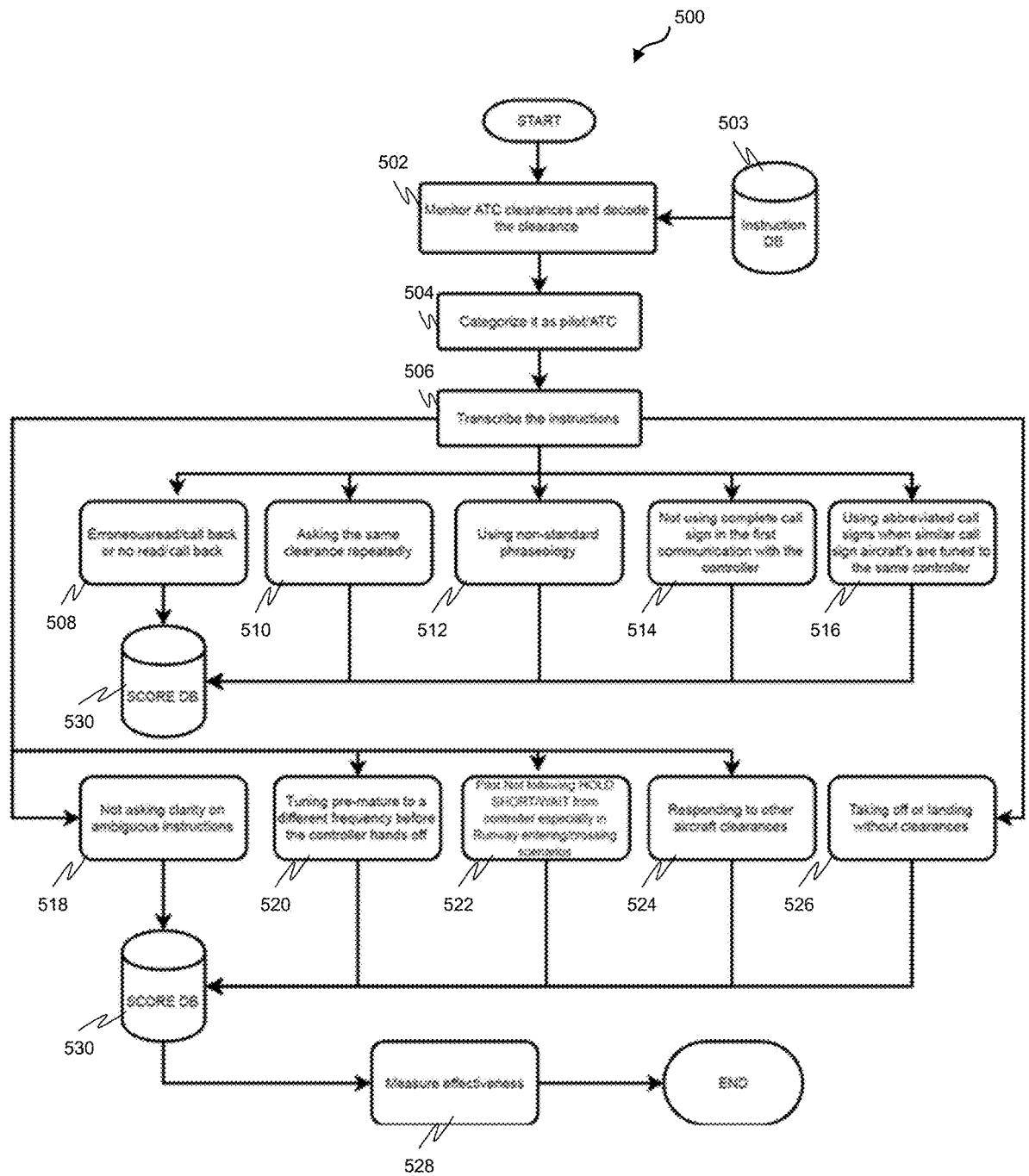
FIG. 5 is a process flow chart depicting an example process for computing an effectiveness score for ownship communication, in accordance with some embodiments.

FIG. 5 is a process flow chart depicting an example process 500 (e.g., implemented by a controller that implements the communication efficiency analysis module 228) for computing an effectiveness score for ownship communication. The order of operation within the process 500 is not limited to the sequential execution as illustrated in the figure but may be performed in one or more varying orders as applicable and in accordance with the present disclosure.

The example process 500 includes monitoring for ATC clearance messages (operation 502) using an instruction database 503, categorizing the clearance messages as pilot or ATC originated message (operation 504) and transcribing the message (operation 506). The transcribed messages are evaluated to determine whether the transcribed messages complied with communication SOP rules (e.g., ICAO rules) and when non-compliance is found each non-compliant message is associated with a parameter and the parameter incidence is stored in a score database 530. The evaluation, in this example, includes evaluation for erroneous read/call back or no read/call back (operation 508), evaluation for asking the same clearance repeatedly (operation 510), evaluation for using non-standard phraseology (operation 512), evaluation for not using complete call sign in the first communication with the controller (operation 514), evaluation for using abbreviated call signs when similar call sign aircraft are tuned to the same controller (operation 516), evaluation for not asking for clarity on ambiguous instructions (operation 518), evaluation for tuning prematurely to a different frequency before the controller hands control off to anther controller (operation 520), evaluation for pilot not following HOLD SHORT/WAIT from controller especially in runway entering/crossing scenarios (operation 522), evaluation for responding to clearances directed to other aircraft (operation 524), and evaluation for taking off or landing without clearances (operation 526).

The example process 500 includes measuring communication effectiveness (operation 528) by computing an effectiveness score for ownship communication based on summing each occurrence of a parameter stored at the score database 530 multiplied by a weight assigned to the parameter.

Figure 6:
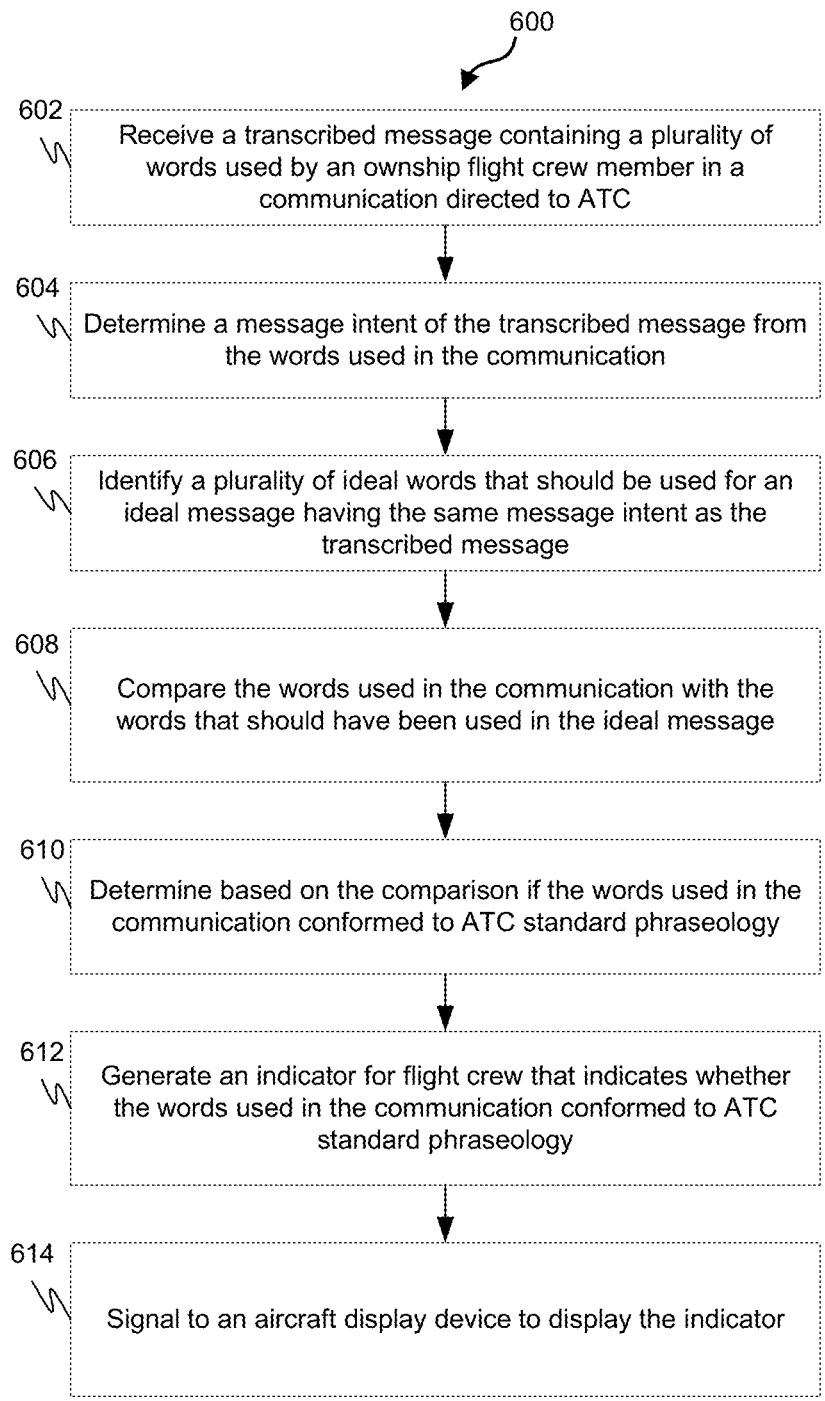
FIG. 6 is a process flow chart depicting an example process in an aircraft for indicating communication effectiveness in communications with ATC, in accordance with some embodiments.

FIG. 6 is a process flow chart depicting an example process 600 (e.g., implemented by a controller) in an aircraft for indicating communication effectiveness in communications with air traffic control (ATC). The order of operation within the process 600 is not limited to the sequential execution as illustrated in the figure but may be performed in one or more varying orders as applicable and in accordance with the present disclosure.

The example process 600 includes receiving a transcribed message containing a plurality of words used by an ownship flight crew member in a communication directed to ATC (operation 602), determining a message intent of the transcribed message from the words used in the communication (operation 604), identifying a plurality of ideal words that should be used for an ideal message having the same message intent as the transcribed message (operation 606), comparing the words used in the communication with the words that should have been used in the ideal message (operation 608), determining based on the comparing whether the words used in the communication conformed to ATC standard phraseology (operation 610), generating an indicator for flight crew that indicates whether the words used in the communication conformed to ATC standard phraseology (operation 612), and signaling to an aircraft display device to display the indicator (operation 614).

Figure 7:
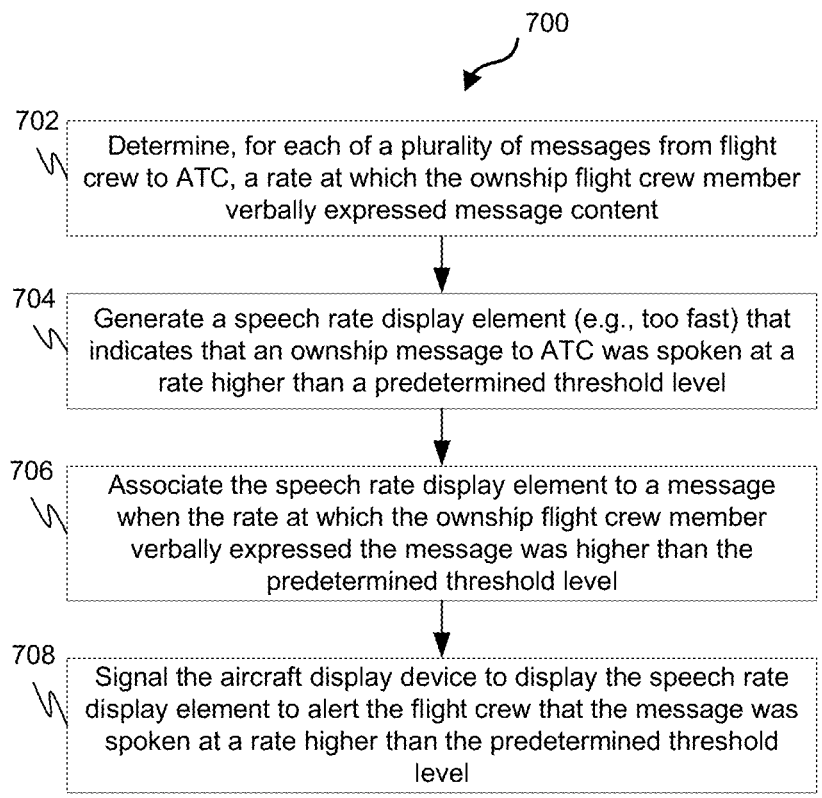
FIG. 7 is a process flow chart depicting another example process in an aircraft for indicating communication effectiveness in communications with ATC, in accordance with some embodiments.

FIG. 7 is a process flow chart depicting an example process 700 (e.g., implemented by a controller) in an aircraft for indicating communication effectiveness in communications with air traffic control (ATC). The order of operation within the process 700 is not limited to the sequential execution as illustrated in the figure but may be performed in one or more varying orders as applicable and in accordance with the present disclosure.

The example process 700 includes determining, for each of a plurality of messages from flight crew to ATC, a rate at which the ownship flight crew member verbally expressed message content (operation 702), generating a speech rate display element (e.g., too fast) that indicates that an ownship message to ATC was spoken at a rate higher than a predetermined threshold level (operation 704), associating the speech rate display element to a message when the rate at which the ownship flight crew member verbally expressed the message was higher than the predetermined threshold level (operation 706), and signaling the aircraft display device to display the speech rate display element to alert the flight crew that the message was spoken at a rate higher than the predetermined threshold level (operation 708).

Figure 8:
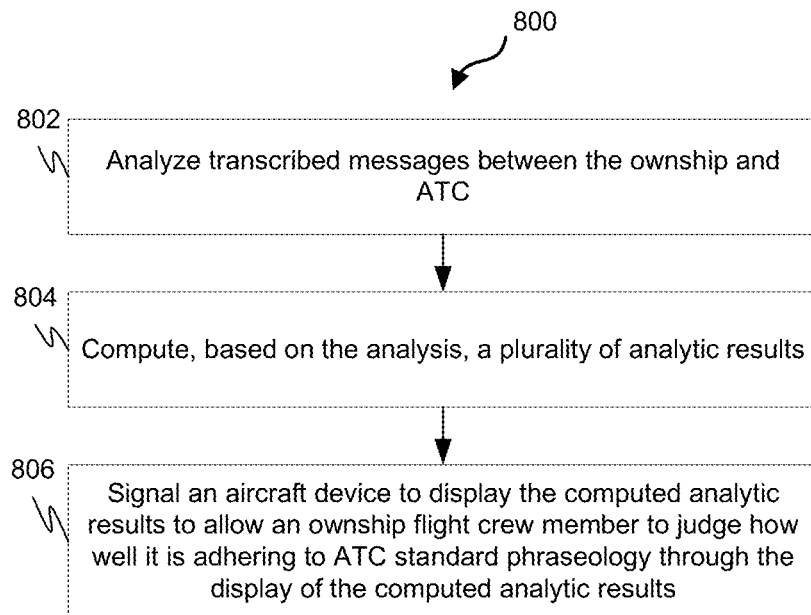
FIG. 8 is a process flow chart depicting another example process in an aircraft for indicating communication effectiveness in communications with ATC, in accordance with some embodiments.

FIG. 8 is a process flow chart depicting an example process 800 (e.g., implemented by a controller) in an aircraft for indicating communication effectiveness in communications with air traffic control (ATC). The order of operation within the process 800 is not limited to the sequential execution as illustrated in the figure but may be performed in one or more varying orders as applicable and in accordance with the present disclosure.

The example process 800 includes analyzing transcribed messages between the ownship and ATC (operation 802). The analytic results include a plurality of: (i) ownship call sign recognition accuracy; (ii) ownship transcription accuracy; (iii) ownship classification accuracy; (iv) a number of instances of ownship callout omissions over a specific period (e.g., a flight); (v) a number of instances of the use of non-standard phraseology over a specific period (e.g., a flight); (vi) a frequency congestion index; (vii) a number of instances of the use of non-standard phraseology in relation to the frequency congestion index; (viii) a total number of communications and communication delays over a specific period (e.g., a flight); and (ix) a number of instances of incorrect and/or inadequate and/or omission of a readback over a specific period (e.g., a flight).

The example process 800 further includes computing, based on the analysis, a plurality of analytic results (operation 804) and signaling an aircraft device to display the computed analytic results to allow an ownship flight crew member to judge how well it is adhering to ATC standard phraseology through the display of the computed analytic results (operation 806).

Figure 9:
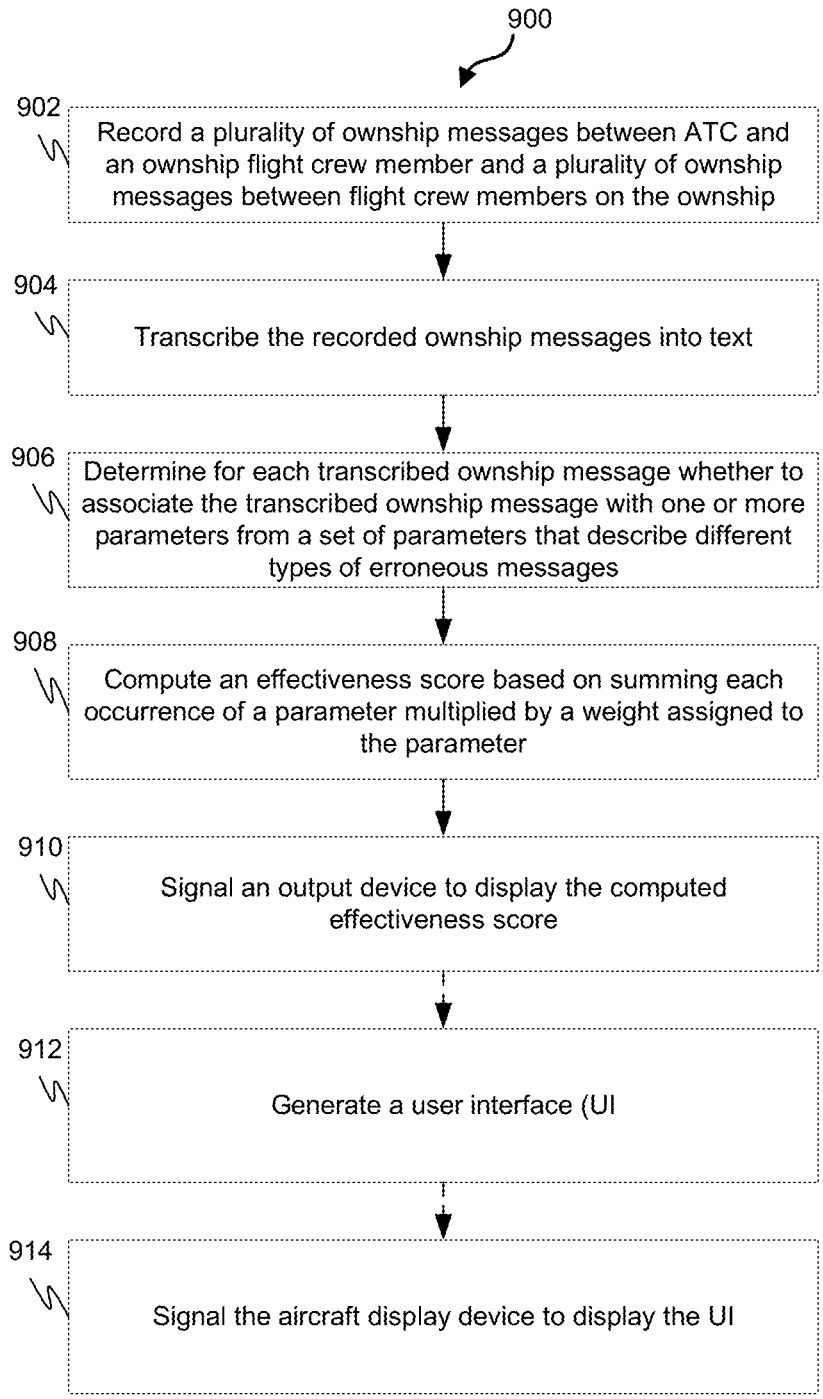
FIG. 9 is a process flow chart depicting another example process in an aircraft for indicating communication effectiveness in communications with ATC, in accordance with some embodiments.

FIG. 9 is a process flow chart depicting an example process 900 (e.g., implemented by a controller) in an aircraft for indicating communication effectiveness in communications with air traffic control (ATC). The order of operation within the process 900 is not limited to the sequential execution as illustrated in the figure but may be performed in one or more varying orders as applicable and in accordance with the present disclosure.

The example process 900 includes recording a plurality of ownship messages between ATC and an ownship flight crew member and a plurality of ownship messages between flight crew members on the ownship (operation 902), transcribing the recorded ownship messages into text (operation 904), determining for each transcribed ownship message whether to associate the transcribed ownship message with one or more parameters from a set of parameters that describe different types of erroneous messages (operation 906), computing an effectiveness score based on summing each occurrence of a parameter multiplied by a weight assigned to the parameter (operation 908), and signaling an output device to display the computed effectiveness score (operation 910).

The example process 900 may further include generating a user interface (UI) (operation 912) that includes one or more parameter selection buttons for selecting a parameter from the set of parameters to review, a first message window panel for displaying a transcribed message associated with the parameter, a second message window panel for displaying a transcribed responsive message, and second buttons for controlling the UI to facilitate scrolling through message exchanges that are associated with the selected parameter; and signaling the aircraft display device to display the UI (operation 914).

The subject matter described herein discloses apparatus, systems, techniques, and articles for indicating communication effectiveness in communications between flight crew in an aircraft and ATC. The disclosed apparatus, systems, techniques, and articles can provide cues to a speaker (e.g., ATC or Pilot) when the speaker is speaking at a rate that is too fast so that the speaker can slow down to provide a message recipient with a better opportunity to understand a message. The disclosed apparatus, systems, techniques, and articles can highlight the usage of nonstandard phraseology in utterances in real time or on demand The disclosed apparatus, systems, techniques, and articles can show the correct phraseology in the context of a specific utterance which had been flagged for usage of nonstandard phraseology. The disclosed apparatus, systems, techniques, and articles can identify usage of nonstandard phraseology for critical information such as ownship call sign, heading, altitude, etc. and provide metrics on demand for a given session. The disclosed apparatus, systems, techniques, and articles can provide a Frequency congestion Index by measuring the ratio of the duration of utterances vs. radio silence over specific time periods. This can be useful to identify busy times vs. relative free times at particular airports. The disclosed apparatus, systems, techniques, and articles can provide insights such as ownship call sign recognition accuracy, ownship transcription accuracy, ownship classification accuracy, number of instances of ownship callout omission, identify and highlight critical information, number of instances of the use of non-standard phraseology, frequency congestion index, number of instances of the use of non-standard phraseology in relation to frequency congestion index, total number of communications and communication delays, and the number of instances of incorrect/ inadequate and/or omission of readback.

In one embodiment, an aircraft system in an aircraft for indicating communication effectiveness in communications with air traffic control (ATC) is provided. The aircraft system comprises an aircraft display device and a controller. The controller is configured to: receive a transcribed message containing a plurality of words used by an ownship flight crew member in a communication directed to ATC; determine a message intent of the transcribed message from the words used in the communication; identify a plurality of ideal words that should be used for an ideal message having the same message intent as the transcribed message; compare the words used in the communication with the words that should have been used in the ideal message; determine, based on comparing the words used in the communication with the words that should have been used, whether the words used in the communication conformed to ATC standard phraseology; generate an indicator for flight crew that indicates whether the words used in the communication conformed to ATC standard phraseology (e.g., ICAO Pilot communication vocabulary); and signal to the aircraft display device to display the indicator.

These aspects and other embodiments may include one or more of the following features. When the words used in the communication do not conform to ATC standard phraseology, the controller is further configured to: generate an annotated message string containing the words used in the communication; identify each word in annotated message string whose use in the communication did not did not conform to ATC standard phraseology; cause each identified word in the annotated message string to be displayed in a visually distinguishable manner (e.g., different color, highlighted, bolded, etc.); and signal the aircraft display device to display the annotated message string to allow the flight crew to judge how well it is adhering to ATC standard phraseology. The controller may be further configured to: identify words from the ideal message that should have been used but were not used in the communication to convey the message intent using ATC standard phraseology; generate a corrected message string containing the words used in the communication that conformed to ATC standard phraseology plus the identified words from the ideal message that should have been used but were not used; and signal the aircraft display device to display the corrected message string. The words from the ideal message that should have been used in the communication but were not used may be made to be visually distinguishable (e.g., different color, highlighted, bolded, etc.). The controller may be configured to make the words that should have been used but not used visually distinguishable automatically after a message is transcribed. The controller may be configured to make the words that should have been used but not used visually distinguishable on demand after a message is transcribed. The controller when identifying words from the ideal message that should have been used but were not used may only identify words that contain critical information including one or more of ownship call sign, heading, and altitude. The controller may be further configured to: determine for each of a plurality of messages from flight crew to ATC a rate at which the ownship flight crew member verbally expressed message content; generate a speech rate display element (e.g., too fast) that indicates that an ownship message to ATC was spoken at a rate higher than a predetermined threshold level; associate the speech rate display element to a message when the rate at which the ownship flight crew member verbally expressed the message was higher than the predetermined threshold level; and signal the aircraft display device to display the speech rate display element to alert the flight crew that the message was spoken at a rate higher than the predetermined threshold level. The controller may be further configured to determine a frequency congestion index for each of a plurality of specific time periods by measuring a ratio of duration of utterances versus radio silence over the plurality of specific time periods to identify busy times versus relative free times at particular locations. The controller may be further configured to: (a) analyze transcribed messages between the ownship and ATC; (b) compute, based on the analysis, a plurality of analytic results that include a plurality of: (i) ownship call sign recognition accuracy; (ii) ownship transcription accuracy; (iii) ownship classification accuracy; (iv) a number of instances of ownship callout omissions over a specific period (e.g., a flight); (v) a number of instances of the use of non-standard phraseology over a specific period (e.g., a flight); (vi) a frequency congestion index; (vii) a number of instances of the use of non-standard phraseology in relation to the frequency congestion index; (viii) a total number of communications and communication delays over a specific period (e.g., a flight); and (ix) a number of instances of incorrect and/or inadequate and/or omission of a readback over a specific period (e.g., a flight); and (c) signal an aircraft display device to display the computed analytic results to allow an ownship flight crew member to judge how well it is adhering to ATC standard phraseology through the display of the computed analytic results.

In another embodiment, an aircraft system in an aircraft for indicating communication effectiveness in communications with air traffic control (ATC) is provided. The aircraft system comprises an aircraft display device and a controller. The controller is configured to: record a plurality of ownship messages between ATC and an ownship flight crew member and a plurality of ownship messages between flight crew members on the ownship; transcribe the recorded ownship messages into text; determine for each transcribed ownship message whether to associate to the transcribed ownship message with one or more parameters from a set of parameters that describe different types of erroneous messages; compute an effectiveness score based on summing each occurrence of a parameter multiplied by a weight assigned to the parameter; and signal an output device to display the computed effectiveness score.

These aspects and other embodiments may include one or more of the following features. The set of parameters may comprise a plurality of: (i) a no readback error parameter that was associated to a clearance message from ATC when an ownship flight crew member did not respond to the clearance message from ATC; (ii) an erroneous readback error parameter that was associated to a clearance message from ATC when a response from an ownship flight crew member to the clearance message from ATC was not provided within a predetermine time frame or did not correspond to an expected response; (iii) a non-standard parameter that was associated to a message when an ownship flight crew member used a word that was not defined in the ICAO Pilot communication vocabulary; (iv) a say again parameter that was associated to a message when an ownship flight crew member had asked for the same clearance more than a predetermined number of times; (v) an incomplete call sign parameter that was associated to a message when an ownship flight crew member did not use a complete call sign when first talking to a new controller; (vi) a did not clarify parameter that was associated to a message when an ownship flight crew member did not ask for clarity on an ambiguous instruction provided by the controller; (vii) a premature frequency switch parameter that was associated to a message when an ownship flight crew member has tuned to a different frequency before the controller asked the flight crew member to do so; (viii) a responding to wrong clearance parameter that was associated to a message when an ownship flight crew member has responded to a clearance message issued to flight crew of another aircraft; (ix) an incorrect execution parameter that was associated to a message when an ownship flight crew member has caused the ownship to take off, land or cross a runway without an explicit clearance from ATC; and (x) a delayed response parameter that was associated to a message when an ownship flight crew member respond to the clearance message from ATC after a predetermine time frame. The controller may be further configured to: generate a user interface (UI) that includes one or more parameter selection buttons for selecting a parameter from the set of parameters to review, a first message window panel for displaying a transcribed message associated with the parameter, a second message window panel for displaying a transcribed responsive message, and second buttons for controlling the UI to facilitate scrolling through message exchanges that are associated with the selected parameter; and signal the aircraft display device to display the UI.

In another embodiment, a method in an aircraft for indicating communication effectiveness in communications with air traffic control (ATC) is provided. The method comprises: receiving a transcribed message containing a plurality of words used by an ownship flight crew member in a communication directed to ATC; determining a message intent of the transcribed message from the words used in the communication; identifying a plurality of ideal words that should be used for an ideal message having the same message intent as the transcribed message; comparing the words used in the communication with the words that should have been used in the ideal message; determining based on the comparing whether the words used in the communication conformed to ATC standard phraseology; generating an indicator for flight crew that indicates whether the words used in the communication conformed to ATC standard phraseology (e.g., ICAO Pilot communication vocabulary); and signaling to an aircraft display device to display the indicator.

These aspects and other embodiments may include one or more of the following features. The method may further comprise, when the words used in the communication do not conform to ATC standard phraseology: generating an annotated message string containing the words used in the communication; identifying each word in annotated message string whose use in the communication did not did not conform to ATC standard phraseology; causing each identified word in the annotated message string to be displayed in a visually distinguishable manner (e.g., different color, highlighted, bolded, etc.); and signaling the aircraft display device to display the annotated message string to allow the flight crew to judge how well it is adhering to ATC standard phraseology. The method may further comprise: identifying words from the ideal message that should have been used but were not used in the communication to convey the message intent using ATC standard phraseology; generating a corrected message string containing the words used in the communication that conformed to ATC standard phraseology plus the identified words from the ideal message that should have been used but were not used; and signaling the aircraft display device to display the corrected message string. The method may further comprise making the words from the ideal message that should have been used in the communication but were not used visually distinguishable (e.g., different color, highlighted, bolded, etc.). The method may further comprise making the words that should have been used but not used visually distinguishable automatically after a message is transcribed. The method may further comprise making the words that should have been used but not used visually distinguishable on demand after a message is transcribed. The method may further comprise identifying only words that contain critical information including one or more of ownship call sign, heading, and altitude when identifying words from the ideal message that should have been used but were not used. The method may further comprise: determining, for each of a plurality of messages from flight crew to ATC, a rate at which the ownship flight crew member verbally expressed message content; generating a speech rate display element (e.g., too fast) that indicates that an ownship message to ATC was spoken at a rate higher than a predetermined threshold level; associating the speech rate display element to a message when the rate at which the ownship flight crew member verbally expressed the message was higher than the predetermined threshold level; and signaling the aircraft display device to display the speech rate display element to alert the flight crew that the message was spoken at a rate higher than the predetermined threshold level. The method may further comprise determining a frequency congestion index for each of a plurality of specific time periods by measuring a ratio of duration of utterances versus radio silence over the plurality of specific time periods to identify busy times versus relative free times at particular locations. The method may further comprise (a) analyzing transcribed messages between the ownship and ATC, (b) computing, based on the analysis, a plurality of analytic results that include a plurality of: (i) ownship call sign recognition accuracy; (ii) ownship transcription accuracy; (iii) ownship classification accuracy; (iv) a number of instances of ownship callout omissions over a specific period (e.g., a flight); (v) a number of instances of the use of non-standard phraseology over a specific period (e.g., a flight); (vi) a frequency congestion index; (vii) a number of instances of the use of non-standard phraseology in relation to the frequency congestion index; (viii) a total number of communications and communication delays over a specific period (e.g., a flight); and (ix) a number of instances of incorrect and/or inadequate and/or omission of a readback over a specific period (e.g., a flight); and (c) signaling an aircraft display device to display the computed analytic results to allow an ownship flight crew member to judge how well it is adhering to ATC standard phraseology through the display of the computed analytic results.

In another embodiment, a method in an aircraft for indicating communication effectiveness in communications with air traffic control (ATC) is provided. The method comprises: recording a plurality of ownship messages between ATC and an ownship flight crew member and a plurality of ownship messages between flight crew members on the ownship; transcribing the recorded ownship messages into text; determining for each transcribed ownship message whether to associate to the transcribed ownship message with one or more parameters from a set of parameters that describe different types of erroneous messages; computing an effectiveness score based on summing each occurrence of a parameter multiplied by a weight assigned to the parameter; and signaling an output device to display the computed effectiveness score.

The set of parameters may comprise a plurality of: (i) a no readback error parameter that was associated to a clearance message from ATC when an ownship flight crew member did not respond to the clearance message from ATC; (ii) an erroneous readback error parameter that was associated to a clearance message from ATC when a response from an ownship flight crew member to the clearance message from ATC was not provided within a predetermine time frame or did not correspond to an expected response; (iii) a non-standard parameter that was associated to a message when an ownship flight crew member used a word that was not defined in the ICAO Pilot communication vocabulary; (iv) a say again parameter that was associated to a message when an ownship flight crew member had asked for the same clearance more than a predetermined number of times; (v) an incomplete call sign parameter that was associated to a message when an ownship flight crew member did not use a complete call sign when first talking to a new controller; (vi) a did not clarify parameter that was associated to a message when an ownship flight crew member did not ask for clarity on an ambiguous instruction provided by the controller; (vii) a premature frequency switch parameter that was associated to a message when an ownship flight crew member has tuned to a different frequency before the controller asked the flight crew member to do so; (viii) a responding to wrong clearance parameter that was associated to a message when an ownship flight crew member has responded to a clearance message issued to flight crew of another aircraft; (ix) an incorrect execution parameter that was associated to a message when an ownship flight crew member has caused the ownship to take off, land or cross a runway without an explicit clearance from ATC; and (x) a delayed response parameter that was associated to a message when an ownship flight crew member respond to the clearance message from ATC after a predetermine time frame. The method may further comprise generating a user interface (UI) that includes one or more parameter selection buttons for selecting a parameter from the set of parameters to review, a first message window panel for displaying a transcribed message associated with the parameter, a second message window panel for displaying a transcribed responsive message, and second buttons for controlling the UI to facilitate scrolling through message exchanges that are associated with the selected parameter; and signaling the aircraft display device to display the UI.

In another embodiment, a non-transitory computer readable medium is provided. The non-transitory computer readable medium is encoded with instructions that when executed by a controller in an aircraft is configurable to cause the controller to perform a method for indicating communication effectiveness in communications with air traffic control (ATC). The method comprises: receiving a transcribed message containing a plurality of words used by an ownship flight crew member in a communication directed to ATC; determining a message intent of the transcribed message from the words used in the communication; identifying a plurality of ideal words that should be used for an ideal message having the same message intent as the transcribed message; comparing the words used in the communication with the words that should have been used in the ideal message; determining based on the comparing whether the words used in the communication conformed to ATC standard phraseology; generating an indicator for flight crew that indicates whether the words used in the communication conformed to ATC standard phraseology (e.g., ICAO Pilot communication vocabulary); and signaling to an aircraft display device to display the indicator.

In another embodiment, a non-transitory computer readable medium is provided. The non-transitory computer readable medium is encoded with instructions that when executed by a controller in an aircraft is configurable to cause the controller to perform a method for indicating communication effectiveness in communications with air traffic control (ATC). The method comprises: recording a plurality of ownship messages between ATC and an ownship flight crew member and a plurality of ownship messages between flight crew members on the ownship; transcribing the recorded ownship messages into text; determining for each transcribed ownship message whether to associate to the transcribed ownship message with one or more parameters from a set of parameters that describe different types of erroneous messages; computing an effectiveness score based on summing each occurrence of a parameter multiplied by a weight assigned to the parameter; and signaling an output device to display the computed effectiveness score.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in software executed by a processor, or in a combination of the two. A software may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An aircraft system in an aircraft for indicating communication effectiveness in communications with air traffic control (ATC), the aircraft system comprising:
    an aircraft display device; and
    a controller configured to:
        receive a transcribed message containing a plurality of words used by an ownship flight crew member in a communication directed to the ATC;
        determine a message intent of the transcribed message from the words used in the communication;
        identify ATC standard phraseology for a message having a same message intent as the transcribed message;
        compare the words used in the communication with the ATC standard phraseology;
    determine, based on the comparing, whether words used in the communication conformed to the ATC standard phraseology;
        generate an indicator for flight crew that indicates whether the words used in the communication conformed to the ATC standard phraseology;
        signal to the aircraft display device to display the indicator;
        determine for each of a plurality of messages from the flight crew to the ATC, a rate at which the ownship flight crew member verbally expressed message content;
        generate a speech rate display element that indicates that an ownship message to ATC was spoken at a rate higher than a predetermined threshold level;
        associate the speech rate display element to a message when the rate at which the ownship flight crew member verbally expressed the message was higher than the predetermined threshold level; and
        signal the aircraft display device to display the speech rate display element to alert the flight crew that the message was spoken at a rate higher than the predetermined threshold level.

2. The aircraft system of claim 1, wherein, when the words used in the communication do not conform to the ATC standard phraseology, the controller is further configured to:
    generate an annotated message string containing the words used in the communication;
    identify each word in the annotated message string whose use in the communication did not conform to the ATC standard phraseology;
    cause each identified word in the annotated message string to be displayed in a visually distinguishable manner; and
    signal the aircraft display device to display the annotated message string to allow the flight crew to judge how well it is adhering to the ATC standard phraseology.

3. The aircraft system of claim 2, wherein the words from the ATC standard phraseology that were not used are made to be visually distinguishable.

4. The aircraft system of claim 3, wherein the controller is configured to make the words from the ATC standard phraseology that were not used visually distinguishable automatically after a message is transcribed.

5. The aircraft system of claim 3, wherein the controller is configured to make the words from the ATC standard phraseology that were not used visually distinguishable on demand after a message is transcribed.

6. The aircraft system of claim 2, wherein the controller when identifying words from the ATC standard phraseology that were not used only identifies words that contain critical information including one or more of ownship call sign, heading, and altitude.

7. The aircraft system of claim 1, wherein the controller is further configured to determine a frequency congestion index for each of a plurality of specific time periods by measuring a ratio of duration of utterances versus radio silence over the plurality of specific time periods to identify busy times versus relative free times at particular locations.

8. The aircraft system of claim 1, wherein the controller is further configured to:
 analyze transcribed messages between an ownship and the ATC;
 compute, based on analyzing transcribed messages between the ownship and the ATC, a plurality of analytic results that include a plurality of:
  (i) ownship call sign recognition accuracy;
  (ii) ownship transcription accuracy;
  (iii) ownship classification accuracy;
  (iv) a number of instances of ownship callout omissions over a specific period;
  (v) a number of instances of the use of non-standard phraseology over a specific period;
  (vi) a frequency congestion index;
  (vii) a number of instances of the use of non-standard phraseology in relation to the frequency congestion index;
  (viii) a total number of communications and communication delays over a specific period; and
  (ix) a number of instances of incorrect and/or inadequate and/or omission of a readback over a specific period; and
 signal an aircraft display device to display the computed analytic results to allow an ownship flight crew member to judge how well it is adhering to the ATC standard phraseology through the display of the computed analytic results.

9. The aircraft system of claim 1, wherein the controller is further configured to:
 identify words from the ATC standard phraseology that were not used in the communication;
 generate a corrected message string to convey the message intent of the transcribed message wherein the corrected message string contains the words used in the communication that conformed to the ATC standard phraseology plus the identified words from the ATC standard phraseology that were not used; and
 signal the aircraft display device to display the corrected message string.

10. A method in an aircraft for indicating communication effectiveness in communications with air traffic control (ATC), the method comprising:
 receiving a transcribed message containing a plurality of words used by an ownship flight crew member in a communication directed to ATC;
 determining a message intent of the transcribed message from the words used in the communication;
 identifying ATC standard phraseology for a message having a same message intent as the transcribed message;
 comparing the words used in the communication with the ATC standard phraseology;
 determining, based on the comparing, whether the words used in the communication conformed to the ATC standard phraseology;
 generating an indicator for flight crew that indicates whether the words used in the communication conformed to the ATC standard phraseology;
 signaling to an aircraft display device to display the indicator;
 determining, for each of a plurality of messages from the flight crew to the ATC, a rate at which an ownship flight crew member verbally expressed message content;
 generating a speech rate display element that indicates that an ownship message to the ATC was spoken at a rate higher than a predetermined threshold level;
 associating the speech rate display element to a message when the rate at which the ownship flight crew member verbally expressed the message was higher than the predetermined threshold level; and
 signaling the aircraft display device to display the speech rate display element to alert the flight crew that the message was spoken at a rate higher than the predetermined threshold level.

11. The method of claim 10, further comprising, when the words used in the communication do not conform to the ATC standard phraseology:
 generating an annotated message string containing the words used in the communication;
 identifying each word in annotated message string whose use in the communication did not conform to the ATC standard phraseology;
 causing each identified word in the annotated message string to be displayed in a visually distinguishable manner; and
 signaling the aircraft display device to display the annotated message string to allow the flight crew to judge how well it is adhering to the ATC standard phraseology.

12. The method of claim 11, further comprising making the words from the ATC standard phraseology that were not used visually distinguishable.

13. The method of claim 11, further comprising identifying only words that contain critical information including one or more of ownship call sign, heading, and altitude when identifying words from the ATC standard phraseology that were not used.

14. The method of claim 10, further comprising:
 analyzing transcribed messages between an ownship and the ATC;
 computing, based on the analyzing, a plurality of analytic results that include a plurality of:
  (i) ownship call sign recognition accuracy;
  (ii) ownship transcription accuracy;
  (iii) ownship classification accuracy;
  (iv) a number of instances of ownship callout omissions over a specific period;
  (v) a number of instances of the use of non-standard phraseology over a specific period;
  (vi) a frequency congestion index;
  (vii) a number of instances of the use of non-standard phraseology in relation to the frequency congestion index;

(viii) a total number of communications and communication delays over a specific period; and
(ix) a number of instances of incorrect and/or inadequate and/or omission of a readback over a specific period; and signaling an aircraft display device to display the computed analytic results to allow an ownship flight crew member to judge how well it is adhering to the ATC standard phraseology through the display of the computed analytic results.

15. The method of claim 10, further comprising:
identifying words from the ATC standard phraseology that were not used in the communication;
generating a corrected message string to convey the message intent of the transcribed message wherein the corrected message string contains the words used in the communication that conformed to the ATC standard phraseology plus the identified words from the ATC standard phraseology that were not used;
signaling the aircraft display device to display the corrected message string.

16. Non-transitory computer readable media encoded with programming instructions configurable to cause a processor in an aircraft to perform a method, the method comprising:
receiving a transcribed message containing a plurality of words used by an ownship flight crew member in a communication directed to air traffic control (ATC);
determining a message intent of the transcribed message from the words used in the communication;
identifying ATC standard phraseology for a message having a same message intent as the transcribed message;
comparing the words used in the communication with the ATC standard phraseology;
determining, based on the comparing, whether the words used in the communication conformed to the ATC standard phraseology;
generating an indicator for flight crew that indicates whether the words used in the communication conformed to the ATC standard phraseology;
signaling to an aircraft display device to display the indicator;
determining, for each of a plurality of messages from the flight crew to the ATC, a rate at which the ownship flight crew member verbally expressed message content;
generating a speech rate display element that indicates that an ownship message to ATC was spoken at a rate higher than a predetermined threshold level;
associating the speech rate display element to a message when the rate at which the ownship flight crew member verbally expressed the message was higher than the predetermined threshold level; and
signaling the aircraft display device to display the speech rate display element to alert the flight crew that the message was spoken at a rate higher than the predetermined threshold level.

17. The non-transitory computer readable media of claim 16, wherein the method further comprises, when the words used in the communication do not conform to ATC standard phraseology:
generating an annotated message string containing the words used in the communication;
identifying each word in annotated message string whose use in the communication did not conform to the ATC standard phraseology;
causing each identified word in the annotated message string to be displayed in a visually distinguishable manner; and
signaling the aircraft display device to display the annotated message string to allow the flight crew to judge how well it is adhering to the ATC standard phraseology.

18. The non-transitory computer readable media of claim 17, wherein the method further comprises identifying only words that contain critical information including one or more of ownship call sign, heading, and altitude when identifying words from the ATC standard phraseology that were not used.

19. The non-transitory computer readable media of claim 17, wherein the method further comprises:
analyzing transcribed messages between an ownship and the ATC;
computing, based on the analyzing, a plurality of analytic results that include a plurality of:
(i) ownship call sign recognition accuracy;
(ii) ownship transcription accuracy;
(iii) ownship classification accuracy;
(iv) a number of instances of ownship callout omissions over a specific period;
(v) a number of instances of the use of non-standard phraseology over a specific period;
(vi) a frequency congestion index;
(vii) a number of instances of the use of non-standard phraseology in relation to the frequency congestion index;
(viii) a total number of communications and communication delays over a specific period; and
(ix) a number of instances of incorrect and/or inadequate and/or omission of a readback over a specific period; and
signaling an aircraft display device to display the computed analytic results to allow an ownship flight crew member to judge how well it is adhering to the ATC standard phraseology through the display of the computed analytic results.

20. The non-transitory computer readable media of claim 16, wherein the method further comprises:
identifying words from the ATC standard phraseology that were not used in the communication;
generating a corrected message string to convey the message intent of the transcribed message wherein the corrected message string contains the words used in the communication that conformed to the ATC standard phraseology plus the identified words from the ATC standard phraseology that were not used;
signaling the aircraft display device to display the corrected message string.

* * * * *